(No Model.)
C. DUBÉ.
SHREDDING ATTACHMENT FOR SUGAR MILLS.
No. 541,786. Patented June 25, 1895.
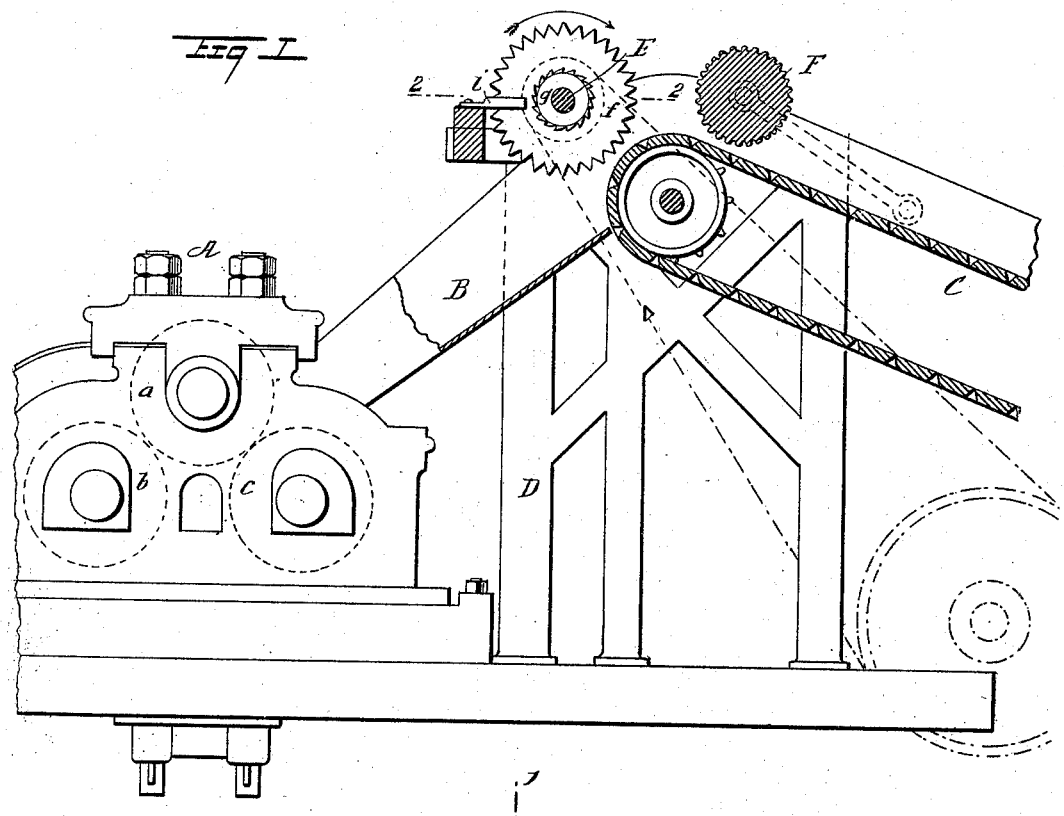
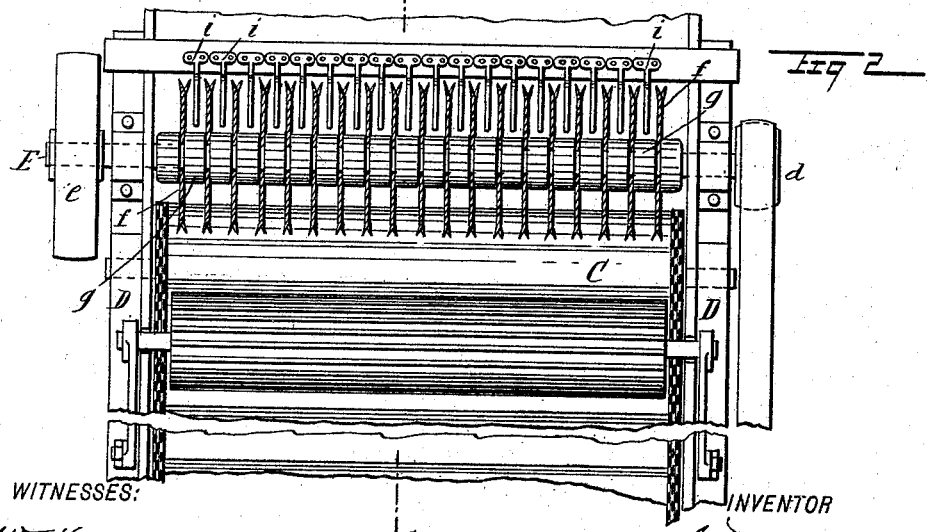
WITNESSES:
H. Walker
G. M. Hopkins.
INVENTOR
C. Dubé
BY
Munn & Co
ATTORNEYS.

UNITED STATES PATENT OFFICE.

CYPRIEN DUBÉ, OF HAVANA, CUBA.

SHREDDING ATTACHMENT FOR SUGAR-MILLS.

SPECIFICATION forming part of Letters Patent No. 541,786, dated June 25, 1895.

Application filed August 21, 1894. Serial No. 520,874. (No model.)

*To all whom it may concern:*

Be it known that I, CYPRIEN DUBÉ, of Havana, Island of Cuba, have invented a new and Improved Shredding Attachment for Sugar-Mills, of which the following is a full, clear, and exact description.

Reference is to be had to the accompanying drawings, forming a part of this specification, in which—

Figure 1 is a side elevation, partly in section, of my improved shredding attachment for sugar-mills, the section being taken on the line 1 1 in Fig. 2; and Fig. 2 is a horizontal section taken on the line 2 2 in Fig. 1.

Similar letters of reference indicate corresponding parts in both the figures.

The object of my invention is to separate the sugar cane into shreds before its passage to the rolls of the cane mill, to insure a more complete extraction of the saccharine juice than is possible when the crushing and compressing action of the rolls alone is depended upon for the results.

The object of my invention is also to economize power by putting the cane in a condition suitable for the most advantageous action of the rolls before allowing it to pass through the mill.

My invention consists in a combination with the endless conveyer and chute employed for carrying the cane of the mill, of a series of toothed disks mounted on a shaft and arranged to act upon the cane in its passage to the mill in such a manner as to reduce the cane to longitudinal shreds, also in the combination with the conveyer of a roller for holding the cane down upon the conveyer and preventing it from escaping the action of the toothed disks.

It also consists in a series of guards inserted between the toothed disks for preventing the shredded material from being carried over by the toothed disks.

The mill A is of the description usually employed for crushing sugar cane, having three rolls *a*, *b*, *c*, between which the cane must pass; also the chute B for conveying the cane to the rolls, and the endless conveyer C for carrying the cane to the chute. These devices are in common use and form no part of my present invention except in so far as my improvements enter into combination with them.

In a frame D embracing opposite sides of the chute B and upper portion of the conveyer C, is journaled a shaft E, which projects beyond the frame and is provided with a pulley *d* at one end and fly wheel *e* at the opposite end. On the shaft E between the sides of the frame D are placed toothed disks *f*, with alternately toothed collars *g*, the series of toothed disks and collars being securely fastened to the shaft so that they will revolve with it. The teeth of the disks are sharpened and set to enable them to cut the cane longitudinally into shreds and the toothed collars serve to cut the skin on the long cane, which may have escaped the toothed disks. The series of disks are placed in front of and a little below the upper end of the endless conveyer C so that the cane carried upwardly by the conveyer will unfailingly be acted upon by the toothed disks. To render the action of the disks more certain, a corrugated roller F rests upon the cane carried by the conveyer, and is held in place by bars pivoted to the sides of the frame of the conveyer and receiving in their free ends the journals of the roller.

To a bar extending from one side of the frame D to the other are attached guards *i*, consisting of short bars of metal extending between the toothed disks. These guards prevent the shredded cane from being carried over with the toothed disks, or winding on the shaft or collars *g*.

Motion is imparted to the shaft E by means of a belt running over the pulley *d*.

The peripheral velocity of the toothed disks is much greater than the velocity of the cane passing to the mill, so that the cane is very thoroughly acted upon by the sharp edges of the teeth of the disks.

Having thus fully described my invention, I claim as new and desire to secure by Letters Patent—

1. In a cane shredding attachment for sugar mills, the combination with the conveyer, of a shaft arranged at the upper end of the conveyer, toothed disks on the said shaft, and toothed collars on the shaft between the disks, substantially as described.

2. In a cane shredding attachment for sugar mills, the combination with the conveyer, of a shaft arranged at the upper end of the conveyer, toothed disks on the shaft, toothed collars on the shaft between the disks, and guards extending in between the disks, substantially as described.

3. In a cane shredding attachment for sugar mills, the combination with the conveyer, of pivoted arms carried by the conveyer frame, a corrugated roller mounted in the said arms, a shaft in front of the upper end of the conveyer, toothed disks on the shaft, toothed collars on the shaft between the disks, and guards projecting between the disks, substantially as described.

CYPRIEN DUBÉ.

Witnesses:
C. SEDGWICK,
F. W. HANAFORD.